Patented Jan. 25, 1944

2,340,007

UNITED STATES PATENT OFFICE 2,340,007

TREATMENT OF HYDROCARBONS

William J. Mattox, Riverside, Ill., assignor to Universal Oil Products Company, Chicago, Ill., a corporation of Delaware No Drawing. Application December 26, 1942, Serial No. 470,239

5 Claims. (Cl. 260—683)

This application is a continuation-in-part of my co-pending application Serial No. 331,934 filed April 27, 1940.

This invention relates to the catalytic treatment of unsaturated hydrocarbons and particularly to the catalytic conversion of olefinic hydrocarbons. By this process normally liquid olefins with straight or branched chain structures may be converted into substantial yields of normally gaseous olefins comprising essentially propylene and butylenes.

With the rapid development of hydrocarbon technology for producing gasolines of high antiknock value by alkylation of low boiling isoparaffins with olefins, it has become necessary to obtain relatively large amounts of normally gaseous olefins including propylene and butylenes. Frequently, normally liquid olefins are more readily available than the more desirable normally gaseous olefins and accordingly it some times becomes highly desirable to convert normally liquid olefins into normally gaseous olefins, particularly propylene and the butylenes. The present invention involves the conversion of normally liquid olefinic hydrocarbons in the presence of a specific type of catalytic material which functions under suitable conditions of operation to catalyze the formation of relatively high yields of normally gaseous olefins, particularly propylene and butylenes.

Many catalysts such as reduced metals and particularly reduced iron and nickel when employed in hydrocarbon conversions generally accelerate reactions leading to the formation of gas, and these catalysts also have the disadvantage of being poisoned readily and of being coated quickly with carbonaceous and hydrocarbonaceous deposits. Many metal oxide catalysts which are available accelerate principally hydrogenation reactions. The preferred catalyst in the present process is characterized, however, by its selectivity in accelerating the formation of propylene and butylenes from normally liquid olefins, its ease and simplicity of manufacture, its reproducibility, and its refractory nature, the latter property enabling it to retain its catalytic properties over extended periods of time during use and reactivation, both operations being carried out at relatively high temperatures.

One specific embodiment of the present invention relates to a process for converting normally liquid olefinic hydrocarbons into substantial yields of normally gaseous olefinic hydrocarbons including propylene and butylenes which comprises subjecting said normally liquid olefinic hydrocarbons to cracking conditions in the presence of a catalyst composite comprising essentially anhydrous aluminum sulfate and alumina.

I have found that a composite of aluminum sulfate and alumina is effective as a catalyst in the conversion of normally liquid olefins into relatively high yields of normally gaseous olefins including propylene and butylenes. The proportions of alumina and aluminum sulfate may be varied in order to produce catalysts of different activities. However, experimental results have shown definitely that the composite catalyst is unexpectedly superior in activity to either of the constituents employed separately as will be shown in a later example.

The different normally liquid olefinic hydrocarbons are not necessarily equivalent in their ease of cracking to produce relatively high yields of propylene and butylenes and accordingly a higher temperature and/or a longer time of contact with the catalyst is generally required when treating the less reactive olefinic hydrocarbons, such as the pentenes, than may be utilized for treating more reactive olefins, such as the heptenes, octenes, and other olefins containing more than five carbon atoms per molecule.

In accordance with the present invention, composites of substantially anhydrous aluminum sulfate and alumina, generally in the form of small pellets or granules, may be utilized as filling material for catalytic reactors through which normally liquid olefins or hydrocarbon fractions containing a relatively high proportion of normally liquid olefins may be passed to form a product containing relatively high amounts of propylene and butylenes. The catalyst may be utilized not only in the form of pellets of uniform size and of cylindrical shape but also as particles of irregular size and shapes produced by grinding, consolidating, and sizing of the relatively dry alumina and aluminum sulfate. The catalyst may also be employed as a powder which may be mixed with normally liquid olefin-containing hydrocarbons or their vapors and passed through suitable reactors to effect conversion.

While the simple procedure of preheating the vapors of the normally liquid olefinic hydrocarbons to a temperature suitable for conversion in contact with the catalyst, and then passing the vapors over a stationary bed or layer of catalyst particles, may be employed in some cases, it may be preferable to pass the preheated vapors through or around a plurality of tubes of relatively small diameter connected in series or in parallel and having the catalyst disposed within or around said tubes since such arrangements of apparatus are well adapted to permit heating and cooling of the catalyst and thus to compensate for heat lost and/or absorbed in the conversion reactions and to dissipate heat liberated during reactivation treatments.

Such reactivation of the catalyst may be carried out rapidly by passing air or other oxygen-containing gas over the used catalyst particles to burn off deposits of carbonaceous or hydrocarbonaceous material at approximately a conversion temperature without affecting appreciably the catalytic activity. After the passage of the hydrocarbon vapors over the catalyst, the products may be separated, generally by fractionation or by other suitable means and the insufficiently converted material may be returned to further catalytic treatment.

The preferred temperature at which normally liquid olefinic hydrocarbons may be contacted with a composite of aluminum sulfate and alumina to produce substantial yields of normally gaseous olefins, particularly propylene and butylenes, is from about 200° to about 500° C. and under a pressure of from about 0.1 atmosphere absolute to a moderately superatmospheric pressure, but generally not in excess of about 35 atmospheres. Under these conditions a major proportion of the normally liquid olefinic hydrocarbons charged to the process may be converted into propylene and butylenes, the latter containing relatively high proportions of isobutylene.

The rate at which the normally liquid olefinic hydrocarbon is passed over the catalyst or otherwise contacted therewith may vary from about 0.1 to about 10 volumes of liquid charge per hour per volume of catalyst space. Continuous operation may be accomplished with relatively little decrease in catalyst activity, but after a time, depending upon the nature of the charge, the conditions of operation, etc., it may be advantageous to remove adsorbed or deposited carbonaceous or hydrocarbonaceous materials by oxidation in air or in another oxygen-containing gas in order to restore to the catalyst a substantial proportion of its original activity.

The following example is given to illustrate the invention, but without any intention of unduly limiting its generally broad scope.

Normal heptene, obtained by dehydrating heptanol-2 over alumina at 400° C., was passed at 400° C. and atmospheric pressure through a steel reactor containing a pelleted composite of approximately 25% by weight of aluminum sulfate and 75% by weight of activated alumina. This run was also repeated after the catalyst had been reactivated by heating in a current of air for 3 hours at 500° C. The results obtained in these runs and also in comparative runs made similarly on alumina alone and on 100% aluminum sulfate are given in the following table:

TABLE

Catalytic conversion of normal heptene at 400° C. and atmospheric pressure

| | Run number | | | |
|---|---|---|---|---|
| | 1 |¹2 | 3 | 4 |
| | Catalyst | | | |
| | 25% aluminum sulfate, 75% alumina | | Alumina | 100% aluminum sulfate |
| Space velocity | 1 | 1 | 1 | 1 |
| Length of run, hours | 1 | 1 | 1 | 1 |
| Reaction product, wt. % of heptene charged: | | | | |
| Total liquid hydrocarbons | 97.3 | 98.3 | 98.9 | 98.8 |
| Uncondensible gas | 0.0 | 0.0 | 0.0 | 0.0 |
| Condensible gas | 13.2 | 10.7 | 0.0 | 0.0 |
| Carbon | 2.7 | 1.7 | 1.1 | 1.9 |
| Loss | | | | +0.7 |
| Analysis of condensible gas: | | | | |
| Ethylene | 0.6 | 0.0 | | |
| Ethane | | 0.4 | | |
| Propylene | 50.3 | 52.2 | | |
| Propane | 6.1 | 4.8 | | |
| Isobutylene | 20.4 | 17.5 | | |
| n-Butylenes | 12.0 | 11.1 | | |
| n+iso-Butane | 9.1 | 12.2 | | |
| Pentanes | 1.5 | 1.8 | | |

¹ This catalyst was that used in run No. 1 and then regenerated by heating in air for 3 hours at 500° C.

The results given in the above table show that the alumina-aluminum sulfate catalyst produced an unexpected result in that relatively high yields of propylene and butylenes were formed from normal heptene at 400° C. whereas substantially no propylene or butylenes were formed at the same temperature when heptene was treated with alumina alone or aluminum sulfate alone.

The character of the present invention and the type of results obtained by its use are evident from the preceding specification and example, although neither section is to be considered as imposing undue limitations upon the generally broad scope of the invention.

I claim as my invention:

1. A process for converting a normally liquid olefinic hydrocarbon into substantial yields of normally gaseous olefinic hydrocarbons including propylene and butylenes which comprises subjecting said normally liquid olefinic hydrocarbon to cracking conditions in the presence of a catalyst composite comprising essentially aluminum sulfate and alumina.

2. A process for converting a normally liquid olefinic hydrocarbon into substantial yields of normally gaseous olefinic hydrocarbons including propylene and butylenes which comprises subjecting said normally liquid olefinic hydrocarbon to cracking at a temperature of from about 200° to about 500° C. in the presence of a catalyst composite comprising essentially aluminum sulfate and alumina.

3. A process for converting a normally liquid olefinic hydrocarbon into substantial yields of normally gaseous olefinic hydrocarbons including propylene and butylenes which comprises heating said normally liquid olefinic hydrocarbon at a temperature of from about 200° to about 500° C. under an absolute pressure of from about 0.1 to about 35 atmospheres in the presence of a catalyst composite comprising essentially aluminum sulfate and alumina.

4. A process for producing substantial yields of propylene and butylenes which comprises cracking an olefinic hydrocarbon containing at least 5 carbon atoms per molecule in the presence of a catalyst composite comprising essentially aluminum sulfate and alumina.

5. A process for producing substantial yields of propylene and butylenes which comprises cracking a heptene at a temperature of from about 200° to about 500° C. in the presence of a catalyst composite comprising essentially aluminum sulfate and alumina.

WILLIAM J. MATTOX.